(12) United States Patent
Christensen

(10) Patent No.: US 7,694,672 B2
(45) Date of Patent: Apr. 13, 2010

(54) SOLAR COLLECTOR PANEL FOR HEATING VENTILATION AIR

(76) Inventor: Hans Jørgen Christensen, Faurskovvej 16, DK-8370 Hadsten (DK)

( * ) Notice: Subject to any disclaimer, the term of this patent is extended or adjusted under 35 U.S.C. 154(b) by 1110 days.

(21) Appl. No.: 10/497,220

(22) PCT Filed: Nov. 26, 2002

(86) PCT No.: PCT/DK02/00789

§ 371 (c)(1),
(2), (4) Date: May 28, 2004

(87) PCT Pub. No.: WO03/048655

PCT Pub. Date: Jun. 12, 2003

(65) Prior Publication Data

US 2005/0061311 A1    Mar. 24, 2005

(30) Foreign Application Priority Data

Dec. 1, 2001    (DK) .............................. 2001 00325

(51) Int. Cl.
*E04D 13/18*    (2006.01)
*H01L 31/00*    (2006.01)

(52) U.S. Cl. ...................... 126/631; 136/246

(58) Field of Classification Search ................ 126/631, 126/569, 204, 6; 136/206, 246
See application file for complete search history.

(56) References Cited

U.S. PATENT DOCUMENTS

| | | | |
|---|---|---|---|
| 3,102,532 A | * | 9/1963 | Shoemaker ................. 126/649 |
| 3,920,413 A | * | 11/1975 | Lowery ....................... 428/629 |
| 4,054,124 A | | 10/1977 | Knoos |
| 4,219,011 A | | 8/1980 | Knoos |
| 4,226,226 A | | 10/1980 | Knoos |
| 4,237,865 A | | 12/1980 | Lorenz |
| 4,262,657 A | | 4/1981 | McCullough et al. |
| 4,271,826 A | * | 6/1981 | Duchene ..................... 126/623 |
| 4,324,289 A | | 4/1982 | Lahti |
| 4,372,373 A | | 2/1983 | Haugeneder et al. |
| 4,538,592 A | * | 9/1985 | Sundquist .................... 126/706 |
| 5,653,222 A | * | 8/1997 | Newman ..................... 126/653 |

FOREIGN PATENT DOCUMENTS

FR    2 500 036    2/1981
GB    2 214 710    9/1989

OTHER PUBLICATIONS

International Search Report; PCT/DK02/00789; Mar. 19, 2003.

* cited by examiner

*Primary Examiner*—Jeffrey T Barton
(74) *Attorney, Agent, or Firm*—Cantor Colburn LLP

(57) ABSTRACT

A solar collector panel is disclosed for heating of air, in which the conventional insulation material on the back panel facing away from the sun is replaced by a spacing between a permeable back panel and a permeable heat absorber means, so that a heat convection airflow through the back panel and into the interior of the solar energy panel against the temperature gradient prevents the convection heat loss in the opposite direction. The back panel also reduces the radiation heat loss from the heat absorber means. Furthermore, in case the flow of air through the solar energy panel is stopped, the convection-insulation will no longer be effective, and a photovoltaic cell panel placed within the solar energy panel and generating electricity from the solar radiation will not be subjected to the damaging high stagnation temperature of a traditionally insulated solar collector panel.

13 Claims, 5 Drawing Sheets

SOLAR COLLECTOR PANEL FOR HEATING VENTILATION AIR

TECHNICAL FIELD OF INVENTION

The present invention relates to a solar collector panel for collection of thermal energy by heating of air, in which the conventional insulation material on the back panel facing away from the sun is replaced by the heat convection airflow through a permeable back panel and into the interior of the solar energy panel against the temperature gradient.

Furthermore, in case the flow of air through the solar collector panel is stopped the convection-insulation will no longer be effective, and a photovoltaic cell panel placed within the solar collector panel and generating electricity from the solar radiation will not be subjected to the damaging high stagnation temperature of a traditionally insulated solar collector panel.

BACKGROUND

Solar collector panels for heating of water for domestic use or for space heating are well known in the art, but also solar collector panels for heating of air, either to be used directly for ventilation and space heating or as a medium for conveying heat to a heat exchanger is known.

The French patent application FR 2500036 shows a typical, simple solar collector panel comprising a transparent front panel, a heat absorbing back panel which is thermally insulated at the back wall, and a passage between the front panel and the back panel, which has an inlet opening at the bottom for allowing cold air to flow into the passage and an outlet opening at the top for exit of the air heated by passing the back panel. The back wall of the back panel facing away from the front panel is thermally insulated to prevent a heat flow from the heat absorbing back panel and out of the solar collector panel.

U.S. Pat. No. 4,054,124 discloses a more sophisticated solar collector panel, in which a perforated heat absorber panel is inserted between the transparent front panel and the thermally insulated back panel. The inlet air flows from the side of the solar collector panel into the space between the front panel and the heat absorber panel, through the perforations at which the air is heated and out from the space between the heat collector panel and the thermally insulated back panel. A much higher heat transfer coefficient between the air and the heat absorber is obtained thereby as compared to the disclosure of FR 2500036.

In U.S. Pat. No. 4,262,657 more variants of solar collector panels are disclosed, using the feature of a permeable heat absorber panel through which the air flows to be heated. It is a common feature of the variants that the back wall of the solar collector panels is thermally insulated to improve the thermal efficiency of the solar panel.

The combination of a solar collector panel for heating of air and a photovoltaic cell panel arranged behind the transparent front panel and in front of the heat collector panel is disclosed in GB 2 214 710. The heat collector plate is thermally insulated towards the exterior and a transparent panel between the photovoltaic cell panel and the heat collector panel separates airflows parallel to the panels to cool the photovoltaic cell panel and to extract heat from the heat collector panel, respectively.

BRIEF SUMMARY OF THE INVENTION

The invention provides a solar collector panel with a construction that simplifies the manufacturing of the solar collector panel and secondarily improves the reliability of the cooling of a photovoltaic cell panel arranged within the solar collector panel.

The solar collector panel according to the present invention comprises a back panel that is permeable to air and open to the surroundings over a major part of the area covered by the front panel, an air permeable heat absorber means extending between and spaced from the front panel and said back panel, and an air outlet opening extending from between the front panel and the heat absorber means to the exterior of the solar collector panel. Thereby, the air flows into the solar collector panel through the back panel against the temperature gradient and replaces the thermal insulating material as long as there is airflow. From there, the air flows through the heat absorber means and out through the outlet opening to be used for ventilation and space heating for e.g. vacation cottages, yachts, cabins, storage containers, cellars, stables and caravans. Other advantages of the present invention and the particular preferred embodiments are disclosed in the following description.

The space between the permeable back panel and the permeable heat absorber means serve as a thermal insulation while the solar collector panel is operating and thus replacing the thermal insulation material used in the art, such as rock wool panels. The substantially uniformly distributed airflow from the colder back panel to the warmer heat absorber means has a direction opposite the temperature gradient and prevents a convection heat loss from the heat absorber means. Heat loss due to radiation in the infrared spectrum from the heat absorber means is effectively reduced by the back panel, which reflects a part of the radiation back to the heat absorber means and absorbs the remaining part as heat energy, which is returned into the solar collection panel by the cold air flowing through the permeable back panel from the surroundings.

The pressure drop of the airflow over the back panel promotes the homogeneity of the airflow distribution over the area spanned by the solar collector panel. This provides the advantage that the airflow velocities are generally low in most of the solar collector panel, with the possible exception of the area close to the outlet, even for solar collector panels spanning a large area or more solar collector panel coupled to each other, as opposed to the traditional solar collector panels having one common air inlet and a generally high velocity of the air. Low velocities means low pressure losses and low generation of noise, and the low air velocity at the intake of air into the solar collector panel, i.e. at the back side of the back panel, has the further effect that only small dust particles are carried with the air flow into the solar collector panel as larger and more heavy particles are less susceptible to be accelerated by the low air velocity. Thus, an air cleaning effect on the ventilation air exhausted from the solar collector panel is obtained as well and filtering of the ventilation air may be reduced or made redundant. The solar collector panel and in particular the permeable parts and the possible filters will be subjected to dust to a reduced extend, thus requiring less maintenance and cleaning of the solar collector panel.

A further advantage of the construction of a solar collector panel according to the invention is that it is particularly suitable for having a photovoltaic cell panel arranged therein, as the construction reduces the risk of excessive heating of the photovoltaic cell panel in case the airflow through the solar collector panel is stopped. When the airflow from the back panel towards the heat absorbing means stops, the thermally insulating action of the airflow is halted as well and heat may now flow from the heat absorber means out through the back panel by natural convection as well as heat radiation, and the excessive heating with stagnation temperatures of more than 120° C. known from solar collector panels with traditional thermal insulating material may be avoided.

Thus, the present invention relates to a solar collector panel comprising at least one transparent or translucent front panel, such as a single or double glass panel or a panel of transparent plastics material, a back panel, an air permeable heat absorber means extending between and spaced from said front panel and said back panel, and an air outlet opening extending to the exterior of the solar collector panel, which solar collector panel is novel over the known art in that the back panel is permeable to air and open to the surroundings over a major part, preferably at least 75%, of the area covered by the front panel, and the air outlet opening extends from the volume enclosed by the front panel and the heat absorber means.

The permeability of the heat absorber means and of the back panel is preferably substantially homogeneous and of a magnitude that allows for a convection-driven airflow through the solar collector panel due to solar radiation on the front panel. A substantially homogeneous permeability to air may e.g. be obtained with a sheet material with a homogeneously distributed perforation or with woven or non-woven fabric.

The front panel, the heat absorber means and the back panel are in a preferred embodiment arranged substantially parallel. The spacing between the front panel and the heat absorber means is preferably in the range from 2 to 15 cm, largest when a photovoltaic cell panel is arranged in the spacing, more preferred in the range from 3 to 10 cm and the most preferred in the range from 4 to 7 cm. The spacing between the heat absorber means and the back panel is preferably in the range from 0.5 to 5 cm, and more preferred in the range from 1 to 3 cm.

It is advantageous to reduce the heat loss from the heat absorber means due to radiation out through the front panel. The front panel may have a coating layer on the inner side facing the heat absorber means that enhances the reflection of radiation in the infrared range, in particular of wavelengths in the range of 5 to 25 $\mu$m where most of the energy of the heat is radiated from the heat absorber means, whereas most of the energy of the solar radiation is found at lower wavelengths.

Another solution is to manufacture the front panel from a plastics material that is much less transparent to the long-wave infrared radiation from the heat absorber means than to the shorter-wave solar radiation.

Alternatively or additionally, a heat radiation trap may be applied to reduce the heat loss from the heat absorber means by infrared radiation through the front panel. Such traps and other means for limiting the heat loss due to re-radiation of heat through the front panel is discussed and disclosed in e.g. U.S. Pat. No. 4,262,657.

The heat absorber means may e.g. be a porous, dark or black fibrous mat, such as felt, or a woven or stamped screen, or a perforated plate material. The heat absorber means may in particular be made from a plate material with opening defined therein of a general diameter or hydraulic diameter for the airflow through the plate, in the range from 0.7 to 3 millimeters arranged with a mutual spacing in the range of 8 to 20 millimeters. The material of the heat absorber means may preferably be a perforated metal plate, preferably made from aluminium but also e.g. steel plates may be employed, of a thickness in the range of 0.4 to 4 millimeters, preferably of 0.7 to 3 millimeters. The side of the heat absorber means facing the front panel is preferably dark or black and mat, so that the absorption coefficient $\alpha$ of the solar spectrum of radiation, i.e. the solar absorptivity $\alpha_s$, is high, preferably in the range of 0.65 to 1, and most preferred in the range of 0.8 to 1. It is also preferred that the side of the heat absorber means facing the back panel has similar properties to absorb as much as possible of the heat radiation emission, mainly reflection, from the back panel.

Likewise, the back panel may be made from a plate material with opening defined therein of a general diameter in the range from 0.7 to 3 millimeters arranged with a mutual spacing in the range of 8 to 20 millimeters. The permeability of the back panel should be substantially homogeneous throughout its extension to promote a homogeneous distribution of the airflow. The back panel may preferably be a perforated metal plate, preferably made from aluminium e.g. of a thickness in the range of 0.4 to 4 millimeters, preferably of 0.7 to 3 millimeters, but other materials may alternatively be employed as well, such as steel, various plastics materials and plywood. The side of the back plate facing the heat absorber means is preferably white or of a light colour and with a reflective surface, so that is has a reflection coefficient $\rho$ of infrared radiation in the range of 0.65 to 1, preferably in the range of 0.8 to 1. The infrared radiation from the heat absorber means is in particular of wavelengths in the range of 5 to 25 $\mu$m where most of the energy of the heat is radiated from the heat absorber means, and the above reflection coefficient is mainly given for this range of wavelengths.

The production of the solar collector panel according to the present invention is simplified if similar plates are used for the heat absorber means and the back panel, e.g. perforated aluminium plates with identical perforation as discussed above. However, it is preferred that the surface properties of the two plates are different in accordance with the particulars given previously.

Instead of using a metal plate for the heat absorber means, it is preferred to employ a fibrous mat, in particular a screen of felt, that should have a dark colour or be black to absorb as much as possible of the solar radiation. Other types of fibrous mats may also be employed, such as woven or non-woven cloth or stamped cloth. A lower mass of the heat absorber means may be obtained by using a fibrous mat as compared to other materials, and the insulating effect is also advantageous for preventing heat from the spacing between the heat absorber means and the front panel from escaping through the back panel.

In a preferred embodiment, the solar collector panel comprises one or more photovoltaic cell panels arranged between the front panel and the heat absorber means. The one or more photovoltaic cell panels may in a further preferred embodiment of the present invention power the drive means of a ventilator that is arranged to force air out through the air outlet opening.

The present invention furthermore relates to a ventilation system comprising a plurality of solar collector panels according to the above description, wherein the air outlet openings of said solar collector panels are mutually connected to a common ventilation duct with a ventilator arranged to force the airflow from said solar collector panels out through the common ventilation duct.

BRIEF DESCRIPTION OF THE DRAWING

Embodiments of the present invention are shown in the enclosed drawing for illustration of how the invention may be carried out, including the following figures.

DETAILED DESCRIPTION OF THE INVENTION

Figure 1:
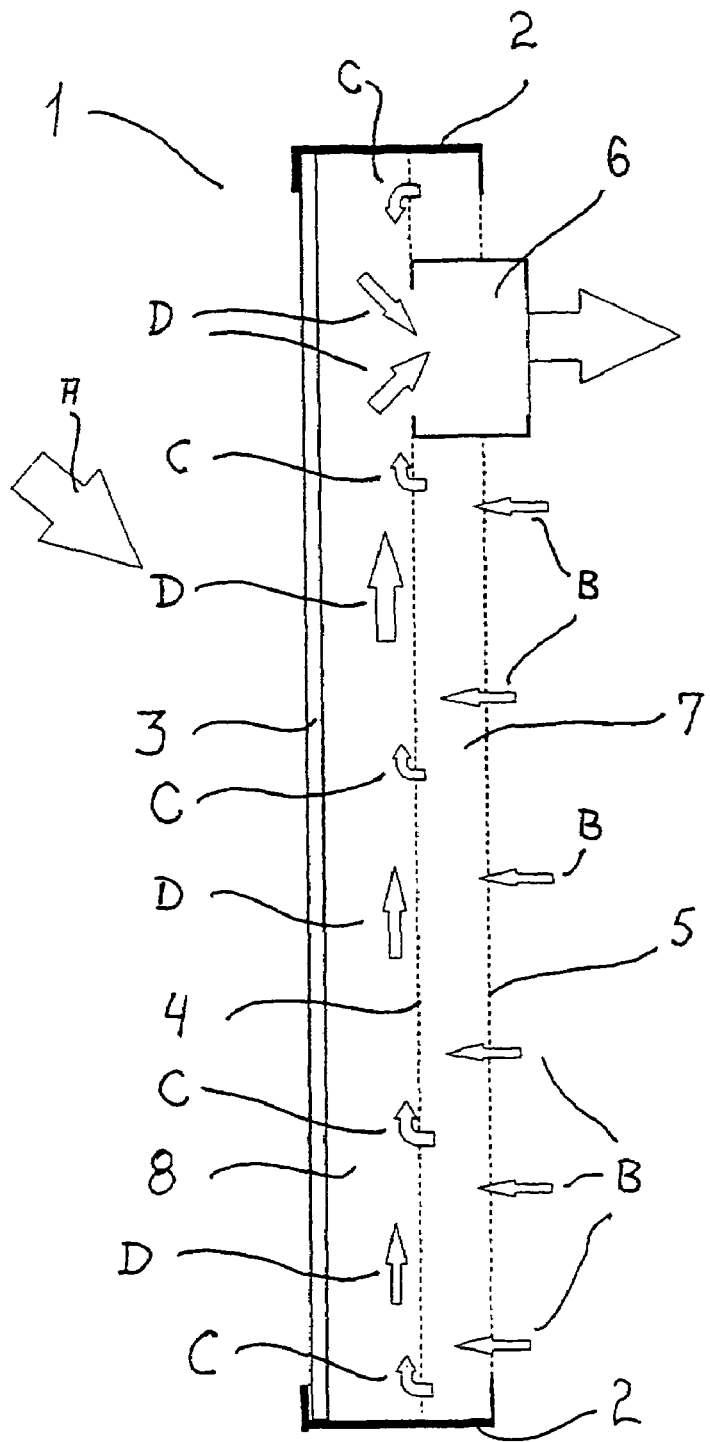
FIG. 1 shows a longitudinal section of a solar collector panel according to a first embodiment of the invention.

A solar collector panel 1 according to a first embodiment of the invention is shown in a longitudinal section in FIG. 1, in which an aluminium frame 2 holds a transparent front panel 3 made from a 10 millimeter plate of polycarbonate with elongated cavities defined therein to lower the weight thereof and improve the thermal insulation, a heat absorber means 4 made from a screen of black felt, and a back panel 5 made from a similar perforated aluminium sheet that is left with a blank side facing the heat absorber means 4. In an alternative embodiment, the heat absorber means 4 is made from a perforated aluminium sheet 0.7 millimeters of thickness, which is painted black or anodised on both sides. The solar collector panel 1 is preferably arranged vertically as shown, and the direction of the solar radiation is indicated with arrow A. An outlet duct 6 is arranged at the upper part of the panel 1 to form a passageway for the heated air to flow out from the panel 1 and to the place where it is utilised, e.g. for room ventilation and heating.

The solar radiation, arrow A, is transmitted through the front panel 3 and reach the heat absorber means 4, at which more than 80% of the energy of the solar radiation is absorbed and the remaining part is reflected out through the front panel 3. The absorbed energy causes the temperature of the heat absorber means 4 to rise to e.g. 40°-90° C. This will cause the heat absorber means 4 to radiate heat as infrared radiation, mainly in the range of 5 to 25 µm. The blank face of the back panel 5 reflects about 70 to 75% of the radiation back to the heat absorber means 4, whereas the remaining part is absorbed by the back panel 5. Only a minor heat loss is caused by re-radiation of heat through the front panel 3 as the type of plastics used to a large extend is opaque to the long-waved radiation from the heat absorber means 4.

Air from the surroundings is, as indicated with arrows B, drawn through the perforated back panel 5, which is cooled so that the absorbed heat radiation from the heat absorber means 4 thereby is conveyed back into the solar collector panel 1. The airflow passes the spacing 7 of approximately 2 cm width between the back panel 5 and the heat collector means 4 in the direction against the temperature gradient and prevents thereby effectively a convection of heat out through the back panel. The airflow passes then, as indicated with arrows C, the heat absorber means 4 where the air is heated and moves mainly upward, as indicated by arrows D, in the spacing 8 of approximately 5 cm between the heat absorber means 4 and the front panel 3, towards the outlet duct 6 arranged in the upper part, preferably near or at the top end, of the solar collector panel 1, and out as indicated by arrow E. The heated air will due to its buoyancy move upward in the spacing 8, and the airflow through the solar collector panel 1 of FIG. 1 is driven by natural convection.

Figure 2:
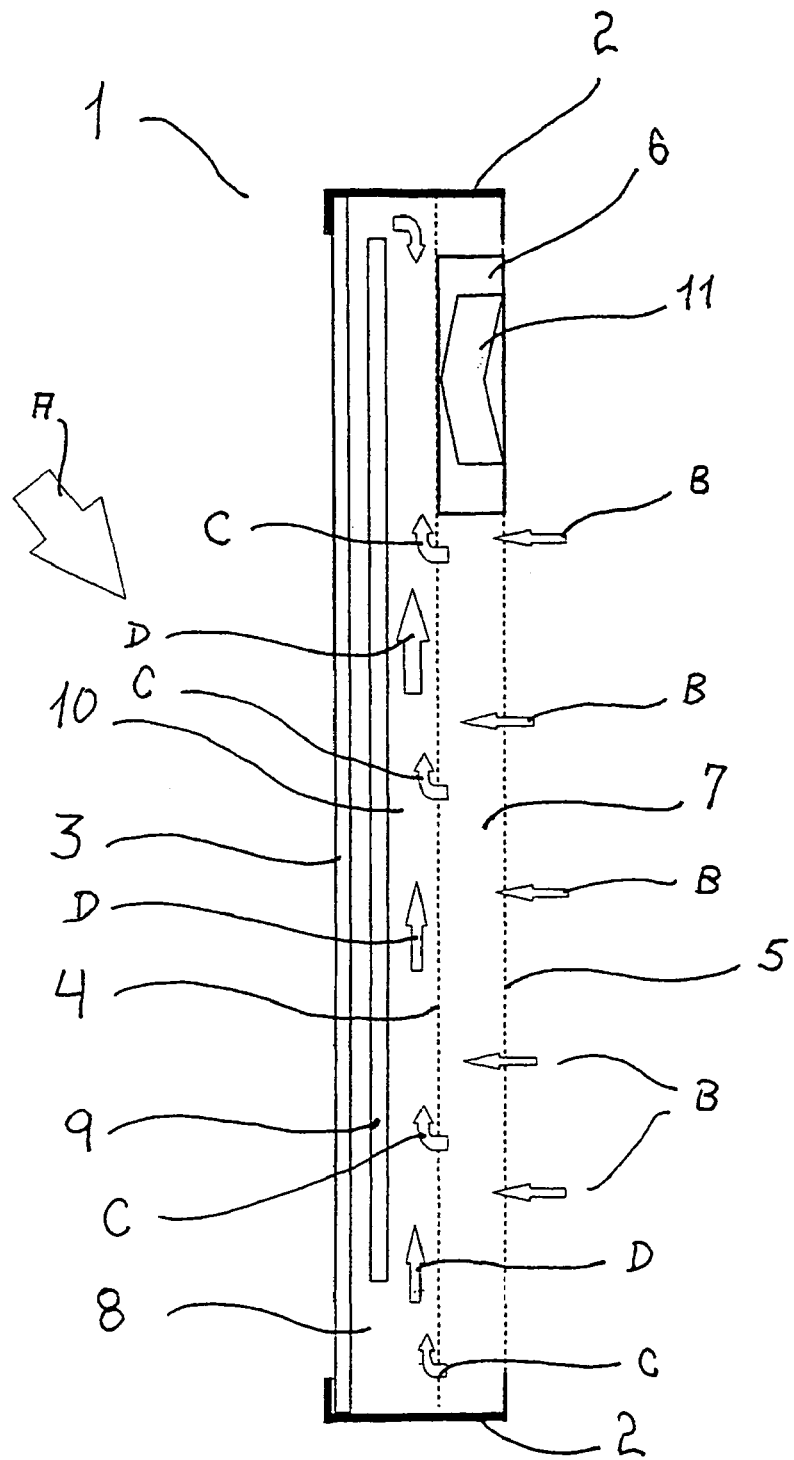
FIG. 2 shows a longitudinal section of a solar collector panel according to a second embodiment of the invention, in which a photovoltaic cell panel and a ventilator is incorporated in the solar collector panel.

FIG. 2 shows a longitudinal section of a solar collector panel 1 according to a second embodiment of the invention, in which a photovoltaic cell panel 9 is arranged in the spacing 8 between the front panel 3 and the heat absorber means 4 with a spacing 10 to the latter to allow a flow of air past the back side of the photovoltaic cell panel 9. The power output from the photovoltaic cell panel 9 is connected to the motor of a ventilator 11 with a fan that is placed in the outlet duct 6, so that a combination of buoyancy forces and the ventilator 11 drives the airflow in this embodiment. However, the buoyancy force is only of a minor magnitude as compared to the effect of the ventilator 11 and is not required for the operation of solar collector panels 1 according to the second embodiment. The ventilator 11 is sufficient to drive an airflow, and the outlet duct 6 may be arranged in any part of the solar collector panel, not only in the upper part of the solar collector panel 1 as is required for the first embodiment. The airflow indicated by arrows D cools the photovoltaic cell panel 9 and prevents excessive heating thereof, and the amount of airflow is increased as well as the thermal efficiency of the solar collector panel 1 as compared to the embodiment of FIG. 1. In case the airflow is stopped or reduced, e.g. due to malfunction of the ventilator 11, contamination of the perforations of the back panel 5 or a blockage of the ventilation duct (not shown) extending downstream of the outlet duct 6, an excessive and possibly destructive or duration-reducing heating of the photovoltaic cell panel 9 is prevented, as the insulating effect of the spacing between the back panel 5 and the heat absorber means 4 will be reduced or eliminated, and the heat loss through the back panel 5 will increase correspondingly.

The solar collector panels 1 according to the first embodiment as well as to the second embodiment may in a variant for operation in environments that are particularly polluted with particles, comprise a filter sheet releasably mounted on the outer face of the back panel 5, so that at least some of the particles in the inlet airflow, arrows B, may be captured before they enter the interior of the solar collector panel 1. The releasable filter sheet may be replaced regularly, or the filter sheet may be removed for cleaning and remounted on the solar collector panel.

Figure 3:
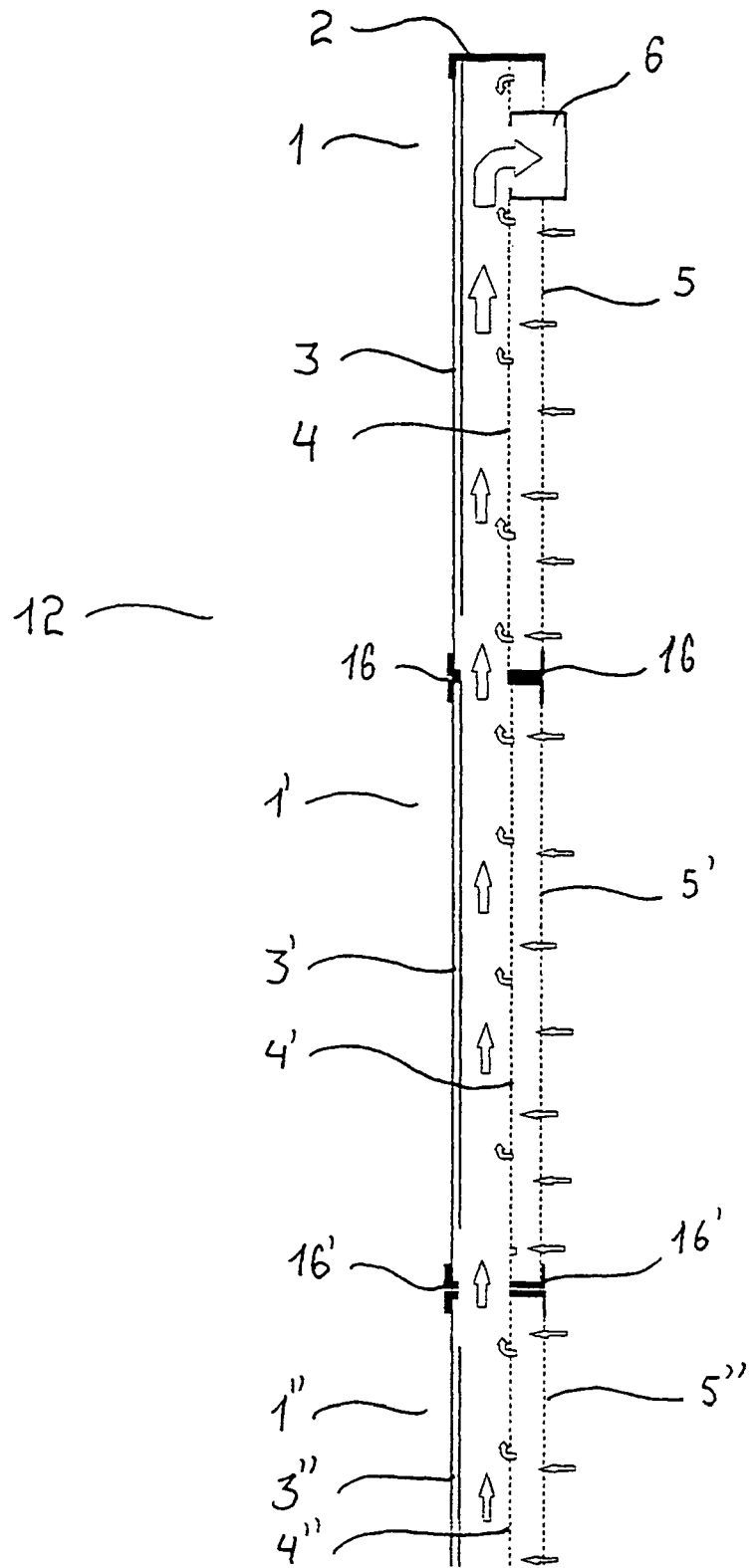
FIG. 3 shows a panel assembly comprising a plurality of solar collector panels according to the first embodiment, coupled together and having a common outlet.

The solar collector panels 1 according to the two embodiments may extend over larger areas, as exemplified in FIG. 3, which shows a panel assembly 12 comprising a plurality of solar collector panels 1, 1', 1" according to the first embodiment coupled together and having a common outlet duct 6. The general air velocity will be low as compared to the known types of solar collector panels for air heating with inlet at the bottom, as the air inflow is distributed over a large area, and higher air velocities, which cause losses and noise, will only occur near the outlet duct 6.

Figure 4:
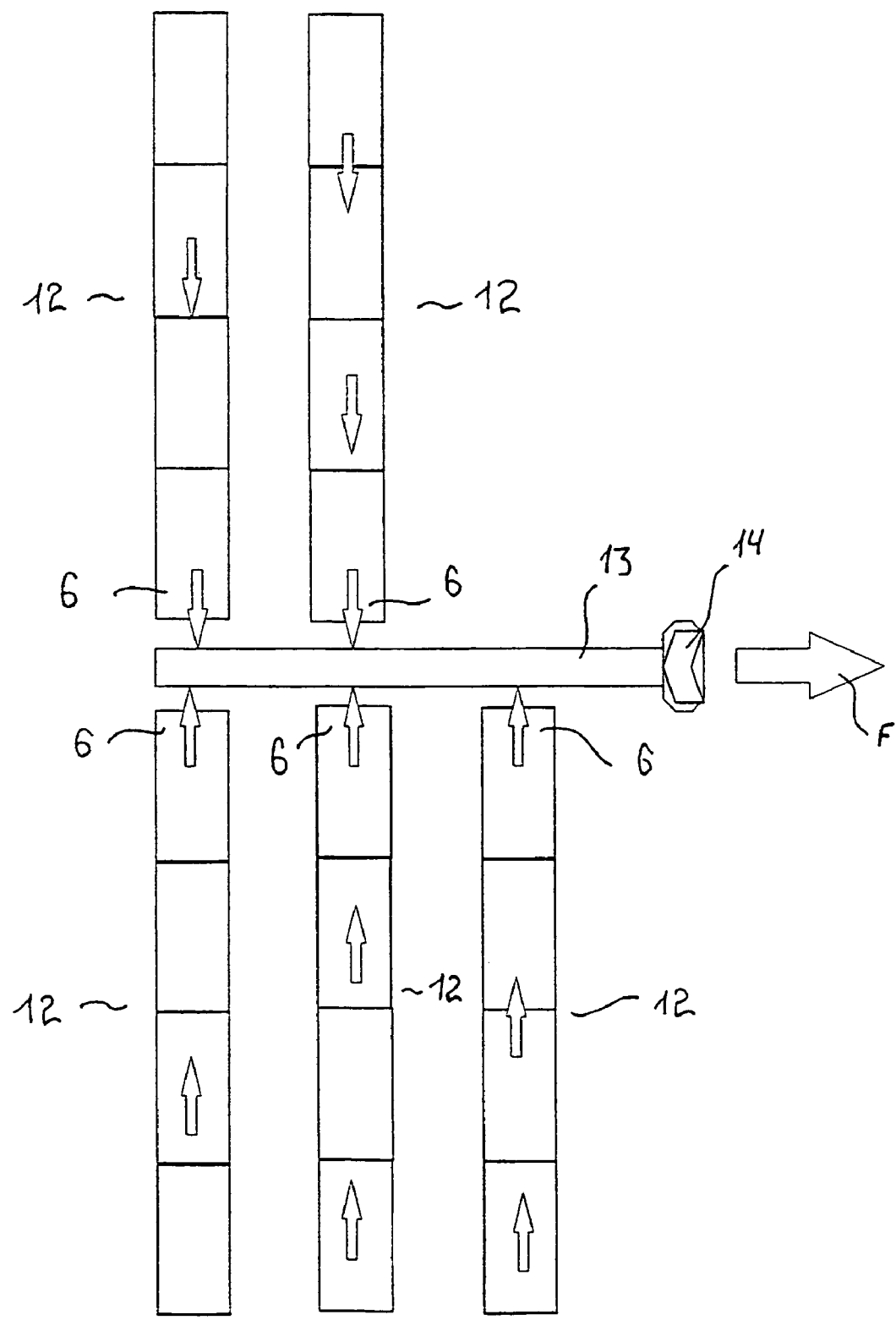
FIG. 4 shows a ventilation system comprising a plurality of panel assemblies of FIG. 3, where the outlets are coupled to a common ventilation duct with a ventilator arranged therein.

A ventilation system comprising a plurality of the panel assemblies 12 of FIG. 3, is shown in FIG. 4 where the outlets 6 of the schematically shown assemblies 12 are coupled to a common ventilation duct 13 with a ventilator 14 arranged therein to produce a common ventilation airflow indicated by arrow F. One or more photovoltaic cell panels 9 arranged in one or more of the solar collector panels 1 may drive the ventilator 15.

Figure 5:
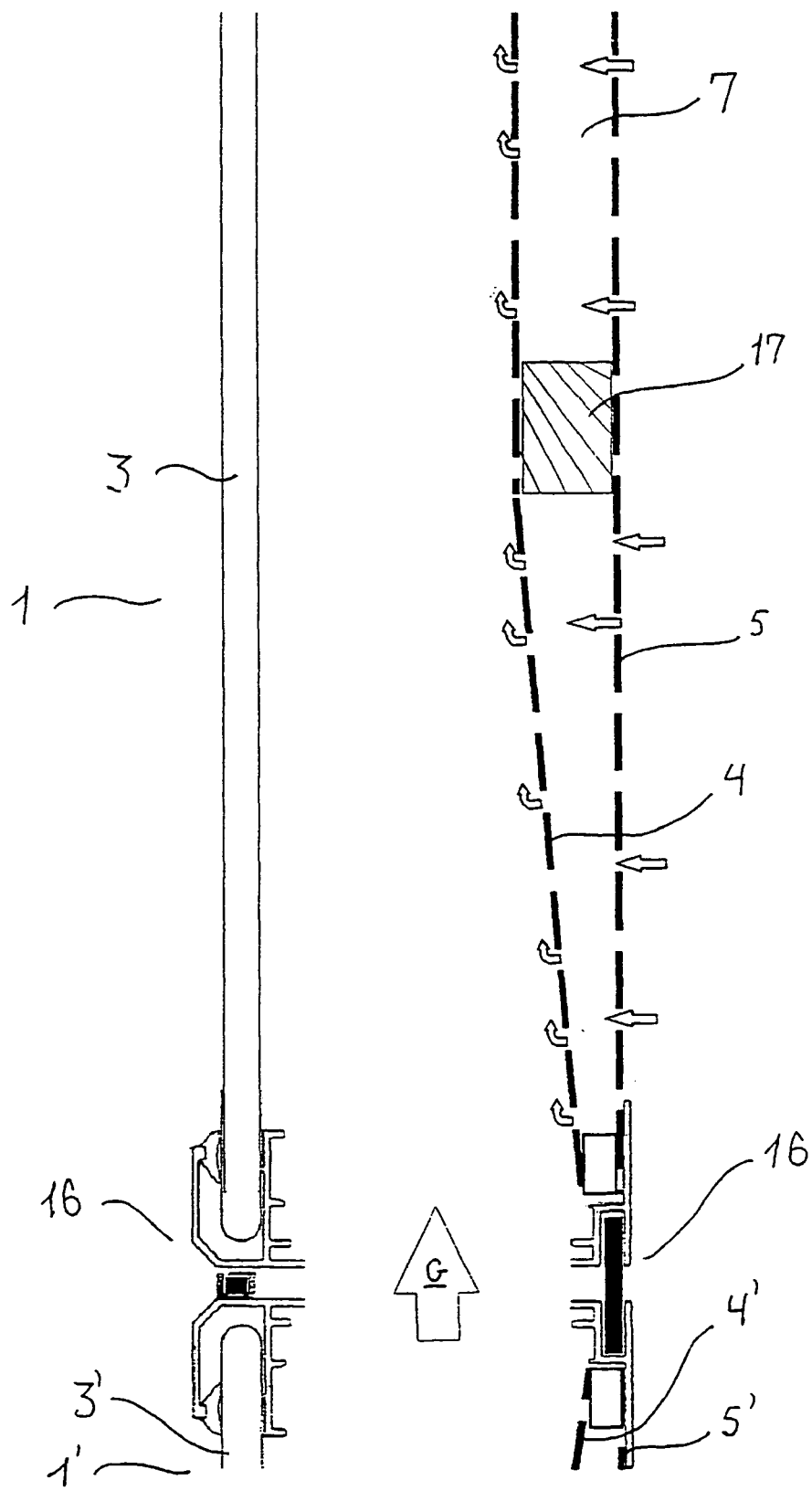
FIG. 5 shows the coupling of two solar collector panels of FIG. 3 in more details.

Details of the coupling of two solar collector panels 1 of FIG. 3 is shown in FIG. 5, in which an open aluminium profile 16 holds the front panels 3, 3', the heat absorber means 4, 4' and the back panels 5, 5' of the two solar collector panels 1, thus allowing for a flow of heated air from one panel 1' to the next 1, as indicated by the arrow G. A spacing member 17 is provided to maintain the correct magnitude of the spacing 7 between the back panel 5 and the heat absorber means 4.

The invention claimed is:
1. A solar collector arrangement comprising a space to be ventilated and heated and a solar collecting panel comprising
  at least one transparent or translucent front panel,
  a back panel, a heat absorber means extending between and spaced from said front panel and said back panel, one or more photovoltaic cell panels arranged between the front panel and the heat absorber means, an air inlet opening to surroundings of the solar collector, and an air outlet opening defined by a structure extending to an exterior of the solar collector panel, said structure also extending into the space to be ventilated and heated, wherein, the air inlet opening and air outlet opening are configured and positioned with the back panel such that air is transported in through the inlet opening and out through the outlet opening in a continuous flow, the air inlet opening is provided by the back panel, which is permeable to air and open to the surroundings over a major part of an area covered by the front panel, the heat absorber means is air permeable, the air outlet opening extends from a volume enclosed by the front panel and the heat absorber means; and a ventilator is arranged to force air out through the air outlet opening to provide said continuous flow, the ventilator being driven by drive means powered by the one or more photovoltaic cell panels.

2. A solar collector panel according to claim 1, wherein the back panel is made from a plate material with openings defined therein of a general diameter in the range from approximately 0.7 to 3 millimeters arranged with a mutual spacing in the range of approximately 8 to 20 millimeters.

3. A solar collector panel according to claim 1, wherein the back panel is a perforated metal plate of a thickness in the range of approximately 0.4 to 4 millimeters.

4. A solar collector panel according to claim 1, wherein the back panel at a side facing the heat absorber means has a reflection coefficient ρ of infrared radiation in the range of approximately 0.65 to 1.

5. A solar collector panel according to claim 1, wherein the heat absorber means is made from a plate material with openings defined therein of a general diameter in the range from 0.7 to 3 millimeters arranged with a mutual spacing in the range of 8 to 20 millimeters.

6. A solar collector panel according to claim 1, wherein the heat absorber means is a perforated metal plate of a thickness in the range of 0.4 to 4 millimeters.

7. A solar collector panel according to claim 1, wherein the heat absorber means is a fibrous mat.

8. A solar collector panel according to claim 1, wherein the heat absorber means at a side facing the front panel has an absorption coefficient α of solar spectrum of radiation in the range of approximately 0.65 to 1.

9. A solar collector panel according to claim 3, wherein the metal plate is made from aluminium.

10. A solar collector panel according to claim 6, wherein the metal plate is made from aluminium.

11. A solar collector panel according to claim 7, wherein the fibrous mat comprises a screen of felt.

12. A ventilation system, comprising:
a solar collector arrangement comprising a space to be ventilated and heated, and
a solar collecting panel comprising
at least one transparent or translucent front panel,
a back panel,
a heat absorber means extending between and spaced from said front panel and said back panel,
one or more photovoltaic cell panels arranged between the front panel and the heat absorber means,
an air inlet opening to surroundings of the solar collector, and
an air outlet opening defined by a structure extending to an exterior of the solar collector panel, said structure also extending into the space to be ventilated and heated,
wherein,
the air inlet opening and air outlet opening are configured and positioned with the back panel such that air is transported in through the inlet opening and out through the outlet opening in a continuous flow,
the air inlet opening is provided by the back panel, which is permeable to air and open to the surroundings over a major part of an area covered by the front panel,
the heat absorber means is air permeable,
the air outlet opening extends from a volume enclosed by the front panel and the heat absorber means; and
a ventilator is arranged to force air out through the air outlet opening to provide said continuous flow, the ventilator being driven by drive means powered by the one or more photovoltaic cell panels,
wherein the air outlet openings of said solar collector panel are mutually connected to a common ventilation duct with a ventilator arranged to force airflow from said solar collector panels out through the common ventilation duct.

13. Method of producing and heating a flow of air for ventilation and space heating, the method comprising:
providing a solar collector arrangement comprising a space to be ventilated and heated, and a solar collecting panel comprising
at least one transparent or translucent front panel,
a back panel,
a heat absorber means extending between and spaced from said front panel and said back panel,
one or more photovoltaic cell panels arranged between the front panel and the heat absorber means,
an air inlet opening to surroundings of the solar collector, and
an air outlet opening defined by a structure extending to an exterior of the solar collector panel, said structure also extending into the space to be ventilated and heated,
wherein,
the air inlet opening is provided by the back panel, which is permeable to air and open to the surroundings over a major part of an area covered by the front panel,
the heat absorber means is air permeable,
the air outlet opening extends from a volume enclosed by the front panel and the heat absorber means; and
a ventilator is arranged to force air out through the air outlet opening, the ventilator being driven by drive means powered by the one or more photovoltaic cell panels;
drawing air into the panel from the surroundings through the air inlet opening in the back panel;
heating the air within the panel, the air moving in a continuous flow from the inlet opening to the outlet opening; and
expelling the heated air from the air outlet opening and into the space to be ventilated and heated.

\* \* \* \* \*